United States Patent
Uhl

(10) Patent No.: US 12,378,983 B2
(45) Date of Patent: Aug. 5, 2025

(54) CONNECTING SLEEVE, PUSH-PULL ROD AND METHOD FOR PRODUCING A PUSH-PULL ROD

(71) Applicant: GMT GUMMI-METALL-TECHNIK GMBH, Bühl (DE)

(72) Inventor: Albert Uhl, Bühl (DE)

(73) Assignee: GMT GUMMI-METALL-TECHNIK GMBH, Bühl (DE)

( * ) Notice: Subject to any disclaimer, the term of this patent is extended or adjusted under 35 U.S.C. 154(b) by 646 days.

(21) Appl. No.: 17/430,014

(22) PCT Filed: Feb. 13, 2019

(86) PCT No.: PCT/EP2019/053595
§ 371 (c)(1),
(2) Date: Aug. 11, 2021

(87) PCT Pub. No.: WO2020/164704
PCT Pub. Date: Aug. 20, 2020

(65) Prior Publication Data
US 2022/0145915 A1    May 12, 2022

(51) Int. Cl.
*F16B 4/00* (2006.01)
*F16B 7/18* (2006.01)
(Continued)

(52) U.S. Cl.
CPC .............. *F16B 4/004* (2013.01); *F16B 7/182* (2013.01); *F16B 17/004* (2013.01); *F16B 39/284* (2013.01); *F16C 7/02* (2013.01)

(58) Field of Classification Search
CPC .... F16B 7/18; F16B 7/182; F16B 7/02; F16B 7/04; F16B 7/0413; F16B 7/0406;
(Continued)

(56) References Cited

U.S. PATENT DOCUMENTS 4,256,412 A * 3/1981 Tybus ..................... F16C 7/026
403/267
4,704,918 A * 11/1987 Orkin ..................... F16C 7/026
464/181
(Continued)

FOREIGN PATENT DOCUMENTS

CN         105492784        4/2016
EP         1588975 A2       10/2005
(Continued)

OTHER PUBLICATIONS

English Translation of Chinese Office Action dated Sep. 1, 2023 from corresponding Chinese Application No. 201980091901.7.
(Continued)

*Primary Examiner* — Jonathan P Masinick
(74) *Attorney, Agent, or Firm* — Grogan, Tuccillo & Vanderleeden LLP

(57) ABSTRACT

A connecting sleeve suitable for the production of a push-pull link bar includes a main body, a coupling section which is formed or arranged on the outer circumferential side on the main body, and a through bore, characterized in that the connecting sleeve has a first seal which is arranged at least partially on the outer circumferential side and a second seal which closes at least the through bore.

19 Claims, 2 Drawing Sheets

(51) Int. Cl.
*F16B 17/00* (2006.01)
*F16B 39/284* (2006.01)
*F16C 7/02* (2006.01)

(58) Field of Classification Search
CPC .......... F16B 4/004; F16B 17/004; F16C 7/02; F16C 7/06
See application file for complete search history.

(56) References Cited

U.S. PATENT DOCUMENTS

| | | | | |
|---|---|---|---|---|
| 4,841,801 | A | 6/1989 | Tice | |
| 5,253,947 | A * | 10/1993 | Petrzelka | B29C 66/721 403/285 |
| 6,193,433 | B1 * | 2/2001 | Gutierrez | F16C 1/14 403/374.1 |
| 6,964,221 | B2 * | 11/2005 | Mickelson | B23P 15/10 92/128 |
| 8,371,767 | B2 * | 2/2013 | Uhl | F16B 7/182 403/46 |
| 9,638,241 | B2 * | 5/2017 | Gallant | G01D 21/00 |
| 2008/0118303 | A1 | 5/2008 | Kennedy | |
| 2012/0224913 | A1 * | 9/2012 | Haller | F16C 7/06 403/46 |
| 2016/0123380 | A1 * | 5/2016 | Godon | F16B 11/008 156/60 |
| 2017/0152884 | A1 * | 6/2017 | Nakamura | F16D 1/068 |

FOREIGN PATENT DOCUMENTS

| | | | |
|---|---|---|---|
| EP | 2266788 | 12/2010 | |
| EP | 2607229 A2 | 6/2013 | |
| EP | 2703660 A2 * | 3/2014 | ............... F16B 7/06 |
| EP | 3115294 B1 * | 4/2018 | ............ B64C 13/30 |
| SU | 796484 | 1/1981 | |
| WO | 2014195868 A1 | 12/2014 | |

OTHER PUBLICATIONS

Indian First Examination Report dated Apr. 13, 2023 from corresponding Indian Application No. 202117036288.
International Search Report from corresponding PCT Application No. PCT/EP2019/053595 dated Nov. 8, 2019.
Russian Office Action dated Jun. 23, 2022 and Russian Search Report dated Jun. 15, 2022 from corresponding PCT Application No. PCT/EP2019/053595.

* cited by examiner

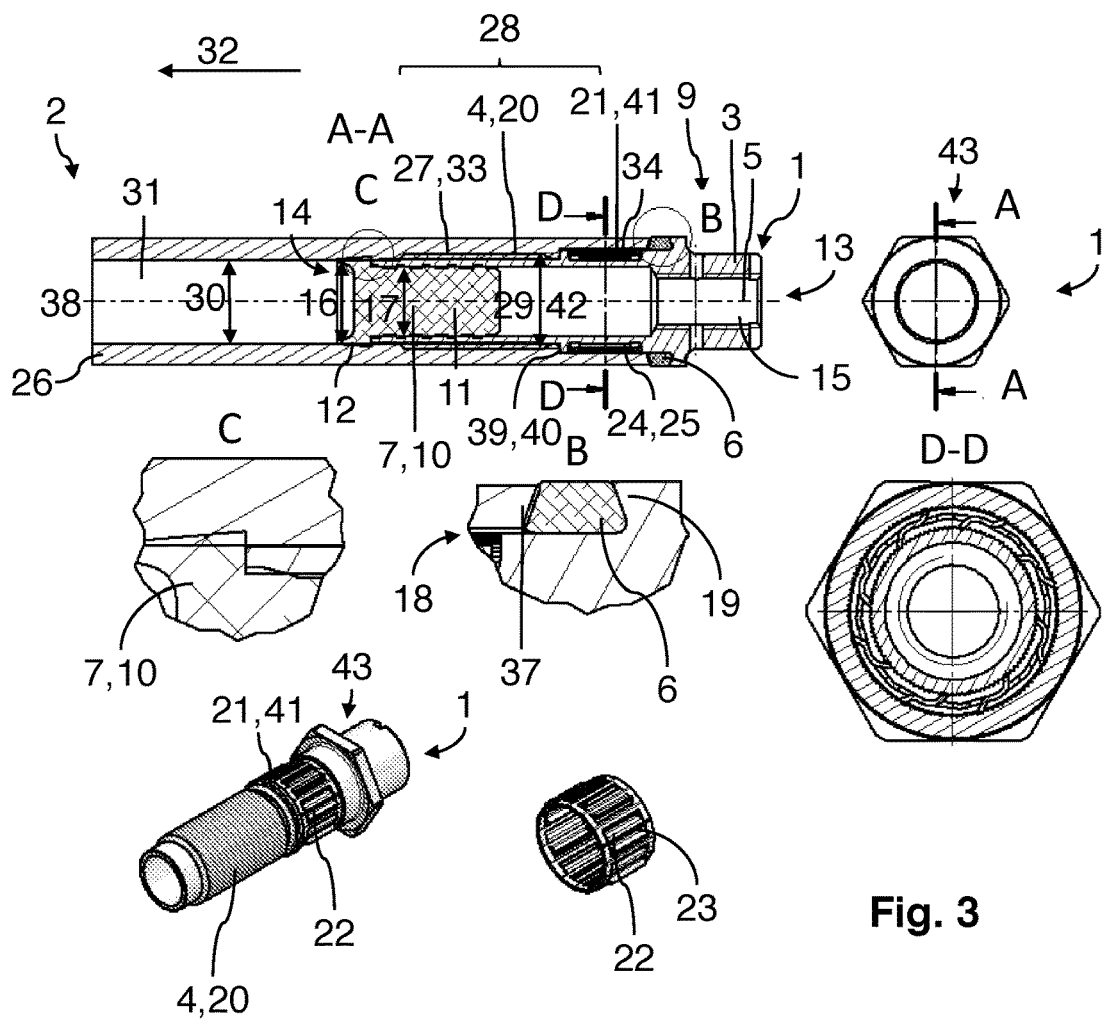
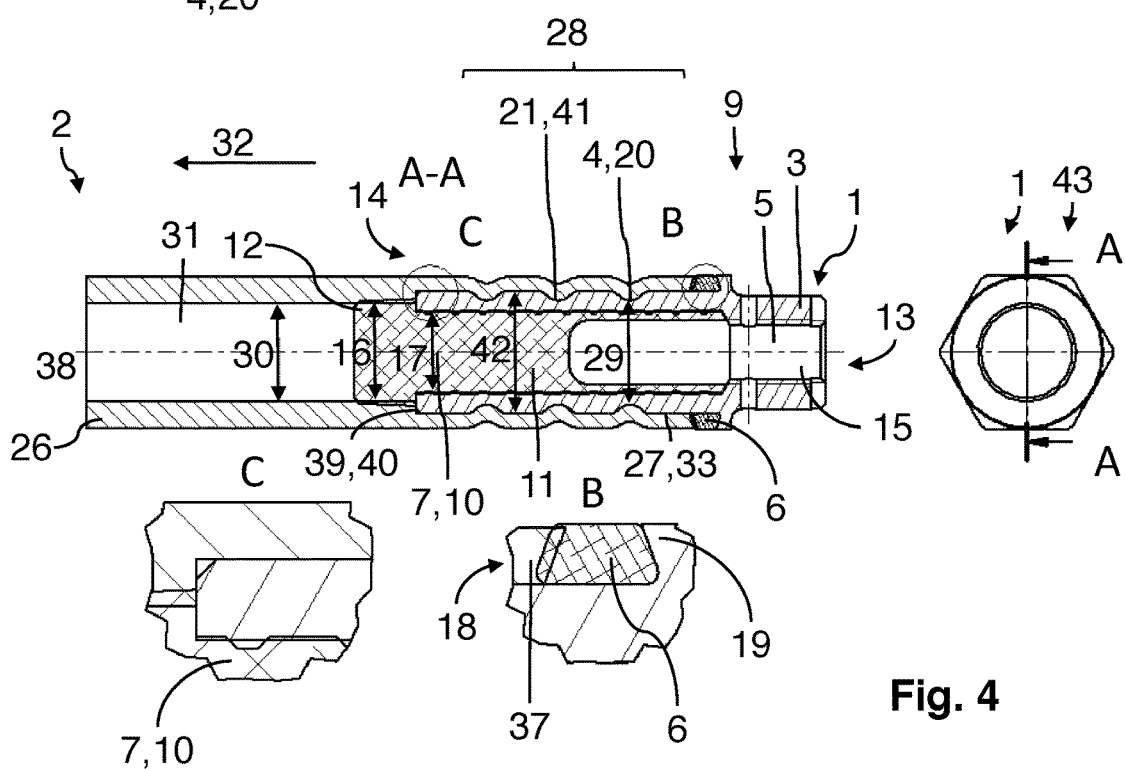

CONNECTING SLEEVE, PUSH-PULL ROD AND METHOD FOR PRODUCING A PUSH-PULL ROD

CROSS REFERENCE TO RELATED APPLICATIONS

This application is a national stage of International Application No. PCT/EP2019/053595, filed on Feb. 13, 2019, all of which is hereby incorporated by reference in its entirety.

BACKGROUND

The invention relates to a connecting sleeve suitable for the production of a push-pull link bar, with a main body, a coupling section which is formed or arranged on the outer circumferential side on the main body, and a through bore.

Furthermore, the invention relates to a push-pull link bar with at least one connecting sleeve and a tubular body which, on the inner circumferential side, has at least one mating coupling section which corresponds to the coupling section of the connecting sleeve, the at least one connecting sleeve and the tubular body coming into contact with one another in a contact region which is formed by way of the coupling section and the mating coupling section.

In addition, the invention relates to the use of a connecting sleeve for the production of a push-pull link bar.

Moreover, the invention relates to a method for the production of a push-pull link bar.

Finally, the invention relates to the use of a push-pull link bar as a component in an aircraft.

Connecting sleeves of the type mentioned at the outset and push-pull link bars of the type mentioned at the outset are used in for example aircraft manufacturing in a versatile manner as a suspension means of components and/or for the stiffening of structures, such as the fuselage of a vehicle.

In aircraft manufacturing, in particular, components which function over a very long time period without maintenance in a manner which is free from malfunctions and failures are required for a very wide variety of applications in the safety-relevant regions outside and also inside the cabin.

In relation to the push-pull link bars, this means that they have to be subjected to precautionary maintenance at very narrow intervals which follow one another and, after a relatively short service life, have to be routinely replaced or at least have to be dismantled, disassembled, checked and installed again during maintenance. These activities are associated with an enormous time and cost outlay.

Push-pull link bars which are manufactured from at least two different metals are frequently used precisely in aircraft manufacturing. For example, push-pull link bars with a tubular body which frequently consists of aluminum and connecting sleeves which are manufactured from stainless steel are known. On account of the abovementioned combination of a noble metal with a less noble metal, an electrochemical reaction occurs between the metallic materials in the contact region of the different metals as soon as a corrosion medium which acts as an electrolyte penetrates into the contact region. What is known as bimetallic corrosion which is also known under the terms of contact corrosion and galvanic corrosion occurs ultimately as a result of the electrochemical reaction. On account of different electrode potentials, an electric voltage is built up between the metallic materials, with the result that electrons of the atoms of the less noble metal migrate into the more noble metal and, from there, lead to a reaction with the electrolyte. As a consequence, oxidation and destruction of the material consisting of the less noble metal occurs.

The corrosion medium is as a rule a liquid, such as, for example, water with dissolved salts. If moisture occurs in the contact region of the two differently noble metals, there is the risk of the occurrence of bimetallic corrosion. In the case of aircraft, in particular, it is not possible to avoid the formation of condensation water on the push-pull link bars on account of the great temperature differences, to which the aircraft is exposed during operation.

In order for it to be possible for the occurrence of bimetallic corrosion to be avoided in the case of push-pull link bars in an improved manner, it has become customary for at least those components of the push-pull link bars which tend toward corrosion to be provided with a surface coating. One substantial disadvantage of the surface coatings which are known at the current time and are suitable for preventing bimetallic corrosion and, in particular, for being used in aircraft manufacturing, consists in that they frequently resort to poisonous and/or environmentally unfriendly substances. For example, anodic or chemical methods for passivation are known. These methods, however, are based, for example, on cadmium and chromium VI compounds ($CrO_3$; $Cr_6$) which are classified as critical hazardous substances and the use of which is to be avoided in future not least on account of the REACH regulation of the European Union, in order to protect human health and the environment against risks. Without the abovementioned substances, however, it is not currently possible to comply with present requirements for corrosion protection.

BRIEF DESCRIPTION

There is therefore the object of providing a connecting sleeve for the production of a push-pull link bar and/or of providing a push-pull link bar, in the case of which the abovementioned disadvantages are eliminated.

According to embodiments of the invention, this object is achieved by way of a connecting sleeve of the type mentioned at the outset with the features as claimed in claim 1. In order to achieve the abovementioned object, in particular, a connecting sleeve of the type mentioned at the outset is proposed, the connecting sleeve having a first seal which is arranged at least partially on the outer circumferential side and a second seal which closes at least the through bore. Therefore, the two seals can prevent moisture from penetrating into the contact region of the connecting sleeve with a further component of the push-pull link bar in the assembled position (use position) of the connecting sleeve, in the case of which assembled position said connecting sleeve is connected to the further component of the push-pull link bar. For example, the connecting sleeve can be inserted into a tubular body (further component). This has the advantage that push-pull link bars which are produced by way of the connecting sleeve according to the invention have considerably longer service lives than previously known push-pull link bars, since no bimetallic corrosion occurs in the contact region. Moreover, the connecting sleeve according to the invention has the advantage that a surface coating of the connecting sleeve or further components which possibly contains poisonous and/or environmentally unfriendly substances can be dispensed with.

In the following text, advantageous refinements of embodiments of the invention will be described which can optionally be combined on their own or in combination with the features of other refinements together with the features as claimed in claim 1.

The two seals can be configured as separate components. It can be provided, in particular, that a hermetic and/or liquid-tight seal is set up or can be set up by way of the two seals, in particular of a contact region which is present in the assembled position between the connecting sleeve and the further component.

In order for it to be possible for particularly satisfactory and long-lasting sealing of the contact region to be configured, the first seal and/or the second seal can be produced at least partially from an elastic material. For example, the elastic material can be rubber and/or a thermoplastic elastomer.

It can be provided here that the first seal is configured as a sealing ring which is arranged so as to run continuously around the outer circumference of the main body of the connecting sleeve. This has the advantage that a first access which is present in the use position to the contact region can be sealed in an improved manner by way of the first seal. For example, in the assembled position, a gap can therefore be sealed between an outer wall of the main body and a further component of a push-pull link bar, such as, for example, the abovementioned tubular body. The first seal can therefore configure an axial and/or radial sealing in the assembled position.

In accordance with one design variant of the second seal, the latter can be configured as a plug which has a part which is introduced into the through bore and a part which protrudes out of the through bore. This has the advantage that a second access which is present in the use position to the contact region can be sealed in an improved manner by way of the second seal. By means of the plug, for example, firstly the through bore can be closed, and secondly a gap which is present in the use position between the main body of the connecting sleeve and the further component, such as the tubular body, can be sealed. The plug can preferably be configured to be at least partially conical and/or to taper in the introduction direction. It is therefore simpler to push the plug during the assembly through a mating coupling section which corresponds to the coupling section of the connecting sleeve. The second seal can therefore configure axial and/or radial sealing in the assembled position.

In accordance with one advantageous embodiment of the connecting sleeve, a first opening of the through bore can be open, and a second opening of the through bore can be closed by way of the second seal. For example, an access to a coupling point which is preferably configured or arranged on the inner circumferential side can be configured by way of the first opening. The coupling point can serve for it to be possible for a connection of the connecting sleeve to a further component of a push-pull link bar to be established. For example, the coupling point can be configured as a receiving thread for stainless steel ends.

In order for particularly satisfactory sealing of a gap which occurs in the assembled position of the connecting sleeve between the main body of the connecting sleeve and a tubular body to be achieved, a maximum external diameter of the second seal can be greater than a maximum external diameter of an end section of the main body, preferably into which end section the second seal is introduced. In particular, the maximum external diameter at a free end of the main body can be smaller than the maximum external diameter of the second seal.

In accordance with one advantageous embodiment of the connecting sleeve, the first seal can have a radially outwardly tapering cross section. In particular, the first seal can have a trapezoidal cross section. The first seal can therefore be clamped or can be capable of being clamped, in the prestressed state (assembled position), at least partially in an undercut which is configured on the main body. This has the advantage that it can therefore be prevented in an improved manner that moisture can pass past the seal into the contact region. As a result of the undercut, the seal can be pressed in the prestressed state in an improved manner onto the outer contour of the main body and onto the further component.

In accordance with one advantageous design variant of the connecting sleeve, the coupling section can be configured at least partially as an external thread. This has the advantage that particularly satisfactory axial securing of the connecting sleeve in the assembled position is achieved by means of the external thread.

In accordance with a further advantageous embodiment, the main body can be produced from at least one metal. For example, the main body can be produced from one or a combination of a plurality of materials selected from the group consisting at least of stainless steel, titanium and/or aluminum.

In order for it to be possible in an improved manner for an undesired torsion of the connecting sleeve relative to a component which is connected to the connecting sleeve, such as, for example, the tubular body, to be avoided, an anti-rotation safeguard section can be configured or arranged on the outer circumference of the main body, a maximum external diameter in the region of the anti-rotation safeguard section being of greater configuration than a maximum external diameter in the region of the coupling section.

As an alternative or in addition to this, it can be provided in accordance with a further advantageous refinement of the connecting sleeve that the connecting sleeve has a securing ring for setting up an anti-rotation safeguard, which securing ring is arranged on the outer circumferential side around the main body, in particular in an anti-rotation safeguard section, for example the abovementioned anti-rotation safeguard section. The securing ring can have tabs which, in the assembled position of the connecting sleeve, configure a latching connection at least with a latching structure on the main body and/or an inner wall of a further component. The latching structure can be configured, for example, by way of a knurled portion.

The anti-rotation safeguard section can be positioned in front of the coupling point in the introduction direction and/or can be capable of being sealed by way of the two seals.

Furthermore, in aspects, the abovementioned object is achieved by way of a push-pull link bar of the type mentioned at the outset with the features of the further independent claim which is directed to a push-pull link bar. In particular, in order to achieve the object, provided are a push-pull link bar of the type mentioned at the outset with at least one connecting sleeve, as is claimed in a manner which is described herein, and a tubular body, the tubular body having, on the inner circumferential side, at least one mating coupling section which corresponds to the coupling section of the connecting sleeve, the at least one connecting sleeve and the tubular body coming into contact with one another in the assembled position in a contact region which is formed by the coupling section and the mating coupling section, the contact region being sealed toward the outside. In particular, a direct contact is established in the contact region. As has already been described in relation to the connecting sleeve, it can therefore be prevented that moisture enters into the contact region and, as a consequence, bimetallic corrosion of the connecting sleeve and/or the tubular body occurs. In addition, as has already been described above, surface coatings of the connecting sleeve and/or of the tubular body can be dispensed with. Moreover, in relation to the push-pull link bar, the same advantages apply as have already been described herein previously in relation to the connecting sleeve.

In the following text, advantageous refinements of the invention will be described which can optionally be combined on their own or in combination with the features of other refinements together with the features as claimed in claim 12.

In accordance with one advantageous development, the sealing of the contact region can take place by way of the first seal and the second seal.

In order to avoid any or virtually any contact corrosion between differently noble metals, the push-pull link rod can be configured in such a way that there is no direct contact between the connecting sleeve and the tubular body outside the sealed contact region. This has the advantage that there is a direct contact of the connecting sleeve with the tubular body exclusively in the contact region and, as a result, the risk of corrosion is curbed. Direct contact can be understood to mean that no substances, layers and/or components which lie in between are provided.

It occurs frequently in aircraft manufacturing that push-pull link bars are used, in the case of which the connecting sleeve and the tubular body are produced from different metals, in particular differently noble metals. For example, they can be produced in each case from at least one metal selected from the group consisting at least of stainless steel, titanium and/or aluminum. On the basis of the invention, it is then possible for the first time for said type of material combination to be used even without a surface coating which protects against corrosion.

In order to achieve particularly satisfactory sealing of the contact region, a maximum external diameter of the second seal can be of wider configuration than a minimum internal diameter of the mating coupling section of the tubular body. As an alternative or in addition to this, the maximum external diameter of the second seal can be of wider configuration than an internal diameter of a core hole bore of the tubular body, which core hole bore is positioned behind the mating coupling section in the introduction direction of the connecting sleeve into the tubular body. It is therefore possible that, by way of its lateral sealing face, the second seal loads an inner wall of the tubular body, in particular of the core hole bore, in the assembled position and therefore seals a gap between the tubular body and the connecting sleeve. Moreover, the second seal is designed in such a way that it can be introduced, in particular can be screwed in, with slight deformation through the mating coupling section of the tubular body. Furthermore, the second seal can be designed in such a way that it is prestressed to a predefined extent in the assembled position, in order to make particularly satisfactory sealing of the gap possible.

In accordance with one design variant of the push-pull link bar, the mating coupling section can be configured at least partially as an internal thread. The internal thread can be configured so as to correspond to the external thread which is configured on the connecting sleeve. It is therefore possible for the connecting sleeve to be screwed into the tubular body, in order to connect the two to one another and to secure them axially.

In order to prevent an undesired rotation of the connecting sleeve relative to the tubular body, a friction section which at least partially loads the anti-rotation safeguard section of the connecting sleeve in the assembled position can be formed on the inner circumference of the tubular body. It can be provided here, in particular, that a maximum external diameter of the anti-rotation safeguard section is of greater configuration than a minimum internal diameter of the friction section. It is therefore possible for an interference fit to be configured, in order to prevent a rotation, as soon as the two components are assembled. As an alternative or in addition to this, the anti-rotation safeguard section can be configured at least partially as a cone. The cone can be part of the outer circumference of the main body. By way of introduction of the connecting sleeve into the tubular body, it is therefore possible to set up a locking action, by a cone envelope of the cone being pressed in the assembled position at least partially against the friction section. Here, a degree of the locking action can be achieved by way of setting of an angle of the cone. The angle is preferably 1:5. The contact region can preferably extend over the region of the anti-rotation safeguard section and the friction section.

In order to achieve an optimum fit of the first seal in the assembled position, in order to ensure particularly satisfactory sealing of the contact region of the push-pull link bar, in the assembled position, the first seal can be clamped in between an undercut, preferably the abovementioned undercut, of the connecting sleeve and an end face of the tubular body. For example, a bearing face of the undercut and/or the end face of the tubular body can be oriented at least partially obliquely with respect to a longitudinal axis of the tubular body, in order to press the second seal in a further improved manner against an outer wall of the main body of the connecting sleeve, and in order to prestress the second seal to a certain extent.

In order for it to be possible for a determined position of the connecting sleeve relative to the tubular body to be set in the assembled position and/or for an extent of a prestress of at least one of the seals to be defined in an improved manner, the tubular body can have a stop, against which, in the assembled position, a counterstop which is configured on the connecting sleeve bears, and/or by way of which a maximum insertion depth of the connecting sleeve into the tubular body and/or a prestress of the first seal are/is defined. The stop can preferably be configured on an inner wall of the tubular body.

In order to prevent an undesired portion of the connecting sleeve with respect to the tubular body in the assembled state, the at least one connecting sleeve can be connected fixedly to the tubular body by way of a fixing means. In particular, the fixing means can be set up such that no movement of the connecting sleeve relative to the tubular body is possible. For example, a non-positive and/or positively locking and/or integrally joined connection can be configured by means of the at least one fixing means.

For example, a fixing means, for example the abovementioned fixing means, can be configured by way of the anti-rotation safeguard section and the friction section which bears at least partially against it. As an alternative or in addition, it can be provided that the fixing means is configured as an adhesive bond which is configured by way of an adhesive which, in particular, cures anaerobically, between the coupling section and the mating coupling section.

Furthermore, the abovementioned object is achieved by way of the use of a connecting sleeve, as is described and claimed herein, for the production of a push-pull link bar, in particular as herein and claimed.

Finally, the abovementioned object is achieved by way of a method for the production of a push-pull link bar, in particular as is described and claimed herein, with the features as claimed in the independent method claim, a connecting sleeve, in particular as described and claimed herein, being inserted in an introduction direction into a tubular body and being connected fixedly to the latter, a first seal sealing a contact region at a point which is positioned in front of the contact region in the introduction direction, a second seal of the connecting sleeve being guided through a mating coupling section which is formed on the inner circumferential side on the tubular body during the introduction of the connecting sleeve into the tubular body, and sealing of the contact region at a point which is positioned behind the contact region in the introduction direction taking place by way of the second seal.

Furthermore, the abovementioned object is achieved by way of the use of a push-pull link bar, as is described and claimed herein, as a component in an aircraft. As has already been described, the described push-pull link bar is particularly suitable to be used even in the case of adverse conditions and/or in the case of high temperature differences, without bimetallic corrosion occurring in the contact region. Maintenance and/or a replacement of the push-pull link bars are/is therefore required more infrequently.

The invention will now be described in greater detail on the basis of a plurality of exemplary embodiments, but is not restricted to said exemplary embodiments. Further exemplary embodiments result from the combination of the features of individual or multiple claims with one another and/or with individual or multiple features of the exemplary embodiments.

BRIEF DESCRIPTION OF THE DRAWINGS

In the drawings:

FIG. 3 shows a third possible design variant of a connecting sleeve and/or a push-pull link bar in a plurality of views, the anti-rotation safeguard being configured by way of a latching connection between a securing ring, a latching structure which is configured on the main body of the connecting sleeve, and an inner wall of the tubular body, and FIG. 4 shows a fourth possible design variant of a connecting sleeve and/or a push-pull link bar in a plurality of views, the anti-rotation safeguard being configured by way of positively locking reshaping of the tubular body.

DETAILED DESCRIPTION

Figure 1:
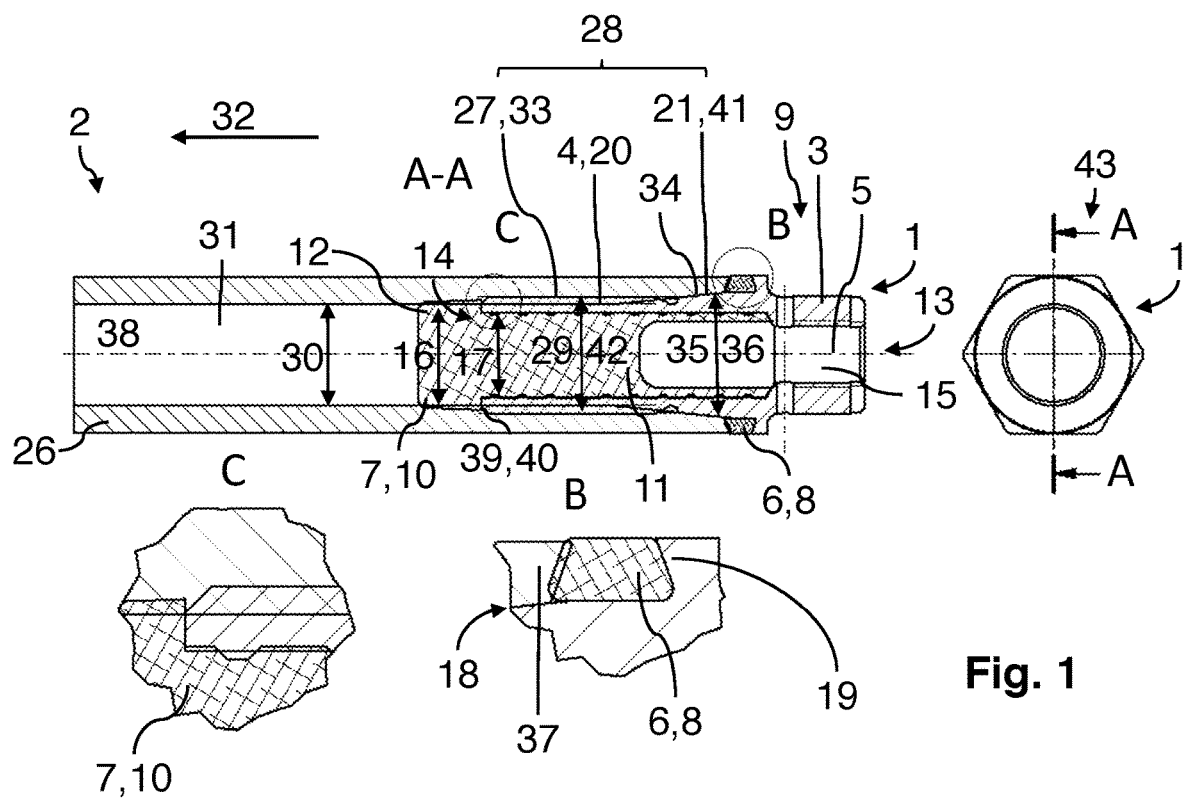
FIG. 1 shows a first possible design variant of a connecting sleeve and/or push-pull link bar in a plurality of views, the anti-rotation safeguard being configured by way of a self-locking cone.

FIGS. 1-4 show four different design variants of a connecting sleeve 1 which, together with a respective tubular body 26, form a push-pull link bar 2. The design variants of the push-pull link bars 2 and/or the connecting sleeves 1 which are shown differ substantially in that an anti-rotation safeguard between the connecting sleeve 1 and the tubular body 26 is realized in the case of the variant embodiments by way of different fixing means 41, which will be described in detail in the following text.

The similarities of the connecting sleeves 1 and/or the push-pull link bars 2 will be described more precisely in the following text with reference to FIGS. 1-4.

The connecting sleeve 1, as is shown in each case in FIGS. 1-4, is suitable for the production of a push-pull link bar 2 which in turn is suitable for absorbing and/or for transmitting forces.

The connecting sleeve 1 has a main body 3 which has a coupling section 4 on its outer circumference 9. It is possible by means of the coupling section 4 to establish a coupling between the connecting sleeve 1 and the tubular body 26.

Furthermore, the connecting sleeve 1 has a through bore 5 which runs through the main body 3.

The connecting sleeve 1 has a first seal 6 which runs at least partially around the outer circumference 9 of the main body 3.

In addition, the connecting sleeve 1 has a second seal 7 which is inserted at least partially into the through bore 5 and seals the latter.

The two seals 6, 7 are produced in each case from an elastic material, such as, for example, a rubber mixture and/or a thermoplastic elastomer, which results in a deformability which is, in particular, reversible.

As can be gathered from FIGS. 1-4, the first seal 6 can be configured, for example, as a sealing ring which is arranged so as to run continuously around the outer circumference 9 of the main body 3.

The second seal 7 is configured as a plug 10 which is divided into a part 11 which is introduced into the through bore 5 and a part 12 which protrudes out of the through bore 5. The plug 10 therefore protrudes beyond the main body 3 at one end of the main body 3. In particular, the plug 3 protrudes beyond the main body 3 at that end of the main body 3, by way of which it is introduced at the front in an introduction direction 32 during the assembly of a push-pull link bar 2 into the tubular body 26. The introduced part 11 seals the through bore 5, and, in the assembled position of the connecting sleeve 1 as part of a push-pull link bar, the protruding part 12 seals a gap between an outer wall of the main body 3 of the connecting sleeve 1 and an inner wall of the tubular body 26, in particular an inner wall of a core hole bore 31.

Therefore, a first opening 13 of the through bore 5 is open to the outside, and a second opening of the through bore 5 is closed by way of the second seal 7. The first opening 13 forms an access to a coupling point 15 which can be configured, for example, as a thread. The coupling point 15 serves for it to be possible for the connecting sleeve 1 to be connected to further components.

A maximum external diameter 16 of the second seal 7 is of wider configuration than a maximum external diameter 17 of an end section of the main body 3, into which the second seal 7 is introduced at least partially. Therefore, a lateral sealing face of the second seal 7 bears in the assembled position against a lateral inner wall which runs in the longitudinal direction in the core hole bore 31 of the tubular body 26.

As can be seen in FIGS. 1B, 2B, 3B and 4B, the first seal 6 has a cross section 18 which tapers radially toward the outside. In the case of the design variant which is shown, the cross section 18 is of trapezoidal configuration. An upper side and a lower side of the first seal 6 are therefore oriented obliquely. This has the advantage that, in the assembled position, that is to say in the prestressed state, the first seal 6 can be clamped in or is clamped in between an undercut 19 which is configured on the main body 3 and/or an end face 37 which is configured on the tubular body 26. Therefore, slipping of the first seal 6 can be avoided in an improved manner even in the case of the action of a contact pressure.

As is shown in FIGS. 1-4, the coupling section 4 can be configured, for example, as an external thread 20. It is therefore possible, for the assembly of a push-pull link bar 2, for the connecting sleeve 1 to be screwed into a corresponding internal thread 33 and for axial securing to be achieved in the assembled position.

An anti-rotation safeguard section 21 is configured or arranged on the outer circumference 9 of the main body 3. Said anti-rotation safeguard section 21 can avoid a rotation of the connecting sleeve 1 relative to a tubular body 26 occurring in the assembled position of the connecting sleeve 1.

Figure 2:
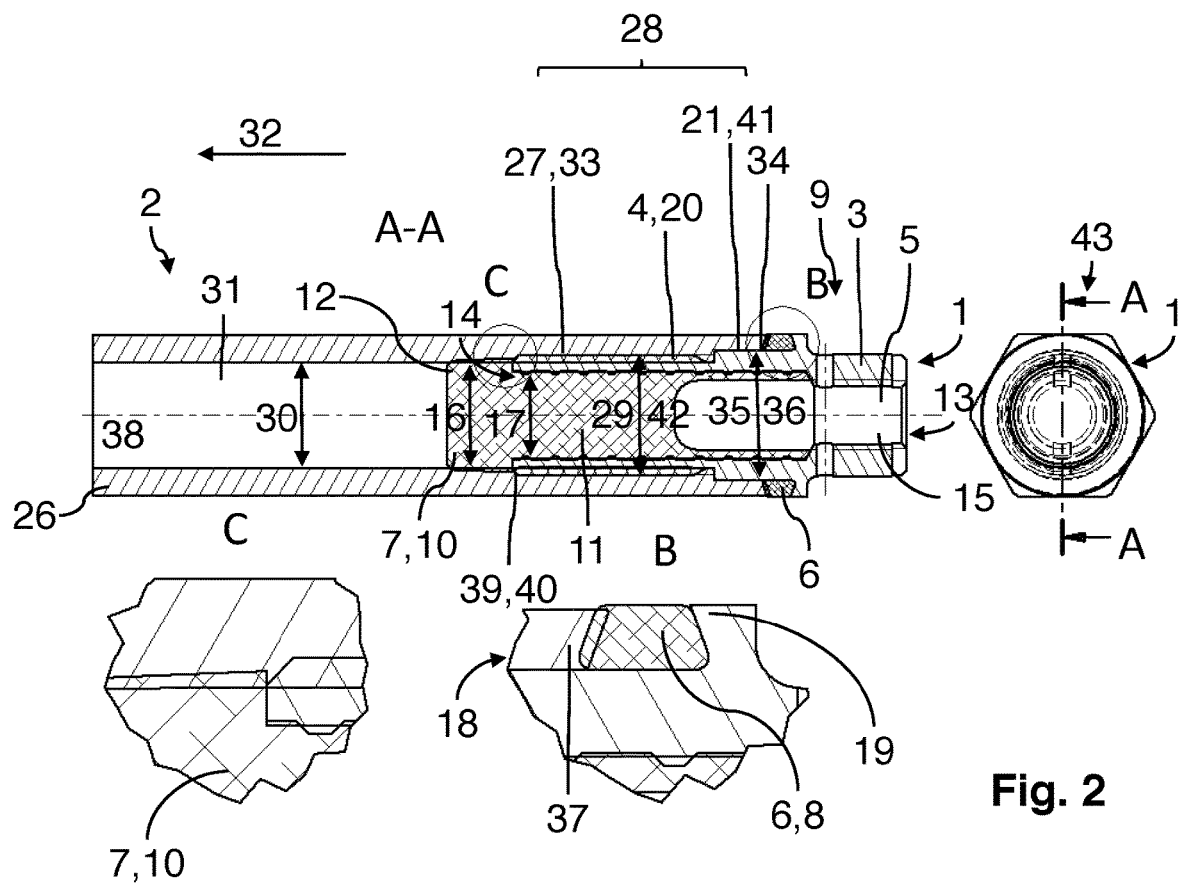
FIG. 2 shows a second possible design variant of a connecting sleeve and/or a push-pull link bar in a plurality of views, the anti-rotation safeguard being configured by way of an interference fit.

A maximum external diameter 35 of the main body 3 in the region of the anti-rotation safeguard section 21 is of greater configuration here than a maximum external diameter 42 in the region of the coupling section 4, in order for it to be possible, for example, for an interference fit and/or self-locking action of the connecting sleeve 1 to be achieved within the tubular body 26. Examples for this design variant are shown in FIGS. 1 and 2.

FIG. 3 shows one design variant with a securing ring 22 for setting up an anti-rotation safeguard. The securing ring 22 has tabs 23 which project to the inside and/or to the outside and, in the assembled position, interlock with a latching structure 24 which is configured, for example, as a knurled portion 25 in the anti-rotation safeguard section 21 on the main body 3. The securing ring 22 can be produced, for example, from a spring steel. It is possible by way of the securing ring 22 to determine a single rotational direction, with the result that a rotation in the opposite direction is not possible on account of the tabs 23. During a screwing-in operation, the outer tabs 23 are driven in a positively locking manner into the tubular body 26. Here, the inner tabs 23 are pressed to the outside by the latching structure 24. Therefore, a positively locking connection can be established between the latching structure 24, the securing ring 22 and the tubular body 26.

FIG. 4 shows a further design variant of a connecting sleeve 1 and/or a push-pull link bar 2, an anti-rotation safeguard of the connecting sleeve 1 relative to the tubular body 26 being realized by way of positively locking reshaping of the tubular body 26 onto the connecting sleeve 1. In order to configure the reshaped portion, pressure is exerted on an outer wall of the tubular body 26, with the result that the inner wall of the tubular body 26 is pressed inward into this region against the connecting sleeve 1 and fixes the latter.

On the inner circumferential side, the tubular body 26 has at least one mating coupling section 27 which corresponds to the coupling section 4 of the connecting sleeve 1. The connecting sleeve 1 and the tubular body 6 are connected to one another via the coupling section 4 and the mating coupling section 27, and configure a contact region 28 here. The mating coupling section 27 can be configured, for example, as an internal thread 33.

The contact region 28 especially tends to bimetallic corrosion if moisture passes into it. In order for it to be possible for a penetration of moisture to be prevented, the contact region 28 is sealed toward the outside in the assembled position. Drainage openings which are usually configured in the case of push-pull link bars can therefore be dispensed with.

The sealing of the contact region 28 takes place by way of the first seal 6 and the second seal 7, by way of which all the accesses to the contact region 28 are sealed.

If possible, there is to be no direct contact between metallic parts of the connecting sleeve 1 and the tubular body 26 outside the contact region 28, in order to avoid electrochemical reactions between the two.

The connecting sleeve 1, in particular the main body 3 of the connecting sleeve 1, and the tubular body 26 are manufactured from different metals. Examples for this can be: stainless steel, titanium and/or aluminum. One embodiment of the push-pull link bar 2 can provide that the connecting sleeve 1 is manufactured from a more noble metal than the tubular body 36 or vice versa. One particularly advantageous embodiment of the push-pull link bar 2 can provide that the main body of the connecting sleeve 1 is manufactured from stainless steel and/or titanium and the tubular body 26 is manufactured from aluminum. As a result of the contact with moisture, corrosion of the mating coupling section 27 would occur in the case of a non-sealed contact region 28, which ultimately leads to actual decomposition of the tubular body 26 and canceling of the function of the push-pull link bar 2.

A maximum external diameter 16 of the second seal 7 is of wider configuration than a minimum internal diameter 29 of the mating coupling section 27 of the tubular body 26. As a result of the at least partially elastic configuration of the second seal 7, it is nevertheless possible for the second seal 7 to be guided through the mating coupling section 27 during the assembly, by the second seal 7 being deformed slightly during the introduction into the mating coupling section 24 and its lateral sealing faces being compressed in the process.

In addition, a maximum external diameter 16 of the second seal 7 is of wider configuration than an internal diameter 30 of a core hole bore 31 of the tubular body 26, which course hole bore 31 is positioned behind the mating coupling section 27 in the introduction direction 32.

A friction section 34 is configured on the inner circumference of the tubular body 26, which friction section 34, in the assembled position, bears at least partially against the abovementioned anti-rotation safeguard section 21 of the connecting sleeve 1 and secures the connecting sleeve 1 against rotation relative to the tubular body 26 by way of an interference fit. A maximum external diameter 35 of the anti-rotation safeguard section 21 is of greater configuration than a minimum internal diameter 36 of the friction section 34.

The end face 37 on the tubular body 26 and/or a bearing face of the undercut 19 which in each case pass into contact with the first seal 6 in order to configure a defined prestress, are/is oriented obliquely with respect to a longitudinal axis 38 of the tubular body 26, in particular with the result that, in the assembled position, the first seal 6 is then braced in a virtually positively locking manner. In combination with the cross section 18 of the first seal 6, which cross section 18 tapers toward the outside in the radial direction, even more improved sealing of the contact region 28 can therefore be achieved, by the obliquely positioned faces pressing the sealing ring 8 inward in the radial direction.

A stop 39 is configured on the tubular body 26, against which stop 39, in the assembled position, the counterstop 40 which is configured on the connecting sleeve 1 bears, and by way of which stop 39 a maximum insertion depth of the connecting sleeve 1 into the tubular body 26 and a defined prestress of the first seal 6 are fixed.

In order for it to be possible for an anti-rotation safeguard of the connecting sleeve 1 within the tubular body 26 to be achieved, the push-pull link bar 2 has a fixing means 41 which can be configured, for example, by way of the anti-rotation safeguard section 21 and the friction section 34 and/or the securing ring 22 and the latching structure 24. As an alternative or in addition, the fixing means 41 can also be configured as an adhesive bond of the connecting sleeve 1 to the tubular body 26, which adhesive bond is configured by way of an adhesive. This can be, in particular, an adhesive which cures anaerobically and can also be arranged within a hermetically sealed contact region 28.

A tool attachment face 43 can be configured on the open side of the main body 3, by means of which tool attachment face 43 the connecting sleeve 1 can be introduced, in particular can be screwed, more simply into the tubular body 26. That part of the main body 3 which configures the coupling point 15 protrudes out of the tubular body 26.

The invention therefore relates, in particular, to a connecting sleeve 1 and/or push-pull link bar 2 with at least one connecting sleeve 1 with a main body 3, a coupling section 4 which is configured or arranged on the outer circumferential side on the main body 3, and a through bore 5, the push-pull rod 2 having a first seal 6 which seals a gap between the main body 3 and a tubular body 26, and the push-pull link bar 2 having a second seal 7 which closes at least the through bore 5, the tubular body 26 having, on the inner circumferential side, at least one mating coupling section 27 which corresponds to the coupling section 4 of the connecting sleeve 1, the at least one connecting sleeve 1 and the tubular body 26 bearing at least partially directly against one another in the assembled position in a contact region 28 which is configured by way of the coupling section 4 and the mating coupling section 27, and the contact region 28 being sealed toward the outside by way of the first seal 6 and the second seal 7, with the result that no moisture passes into the contact region 28.

The invention claimed is:

1. A push-pull link bar comprising:
   at least one connecting sleeve;
   a tubular body which, on an inner circumferential side, has at least one mating coupling section which corresponds to a coupling section of the connecting sleeve, the at least one connecting sleeve and the tubular body coming into contact with one another in an assembled position in a contact region which is formed by the coupling section and the mating coupling section, wherein the contact region is sealed toward an outside; and
   wherein the sealing of the contact region takes place by way of a first seal and a second seal, and
   wherein, in the assembled position, the first seal is clamped in between an undercut of the connecting sleeve and an end face of the tubular body, the end face being oriented at least partially obliquely with respect to a longitudinal axis of the tubular body.

2. The push-pull link bar as claimed in claim 1, wherein there is no direct contact between the connecting sleeve and the tubular body outside the sealed contact region.

3. The push-pull link bar as claimed in claim 1, wherein the connecting sleeve and the tubular body are produced from at least one metal selected from the group consisting of stainless steel, titanium and/or aluminum.

4. A push-pull link bar comprising:
   at least one connecting sleeve;
   a tubular body which, on an inner circumferential side, has at least one mating coupling section which corresponds to a coupling section of the connecting sleeve, the at least one connecting sleeve and the tubular body coming into contact with one another in an assembled position in a contact region which is formed by the coupling section and the mating coupling section, wherein the contact region is sealed toward an outside; and
   wherein the sealing of the contact region takes place by way of a first seal and a second seal,
   wherein the at least one connecting sleeve has the first seal which is arranged at least partially on an outer circumferential side of the push pull link bar and the second seal which closes at least a through bore in the push-pull link bar, and
   wherein a maximum external diameter of the second seal is greater than a maximum external diameter of an end section of a main body into which end section the second seal is introduced at least partially.

5. The push-pull link bar as claimed in claim 4, wherein a friction section which at least partially loads an anti-rotation safeguard section of the connecting sleeve in the assembled position is formed on an inner circumference of the tubular body, a maximum external diameter of the anti-rotation safeguard section being of greater configuration than a minimum internal diameter of the friction section.

6. The push-pull link bar as claimed in claim 4, wherein the tubular body has a stop, against which, in the assembled position, a counterstop which is configured on the connecting sleeve bears, and/or by way of which a maximum insertion depth of the connecting sleeve into the tubular body and/or a prestress of the first seal are/is defined.

7. The push-pull link bar as claimed in claim 4, wherein the at least one connecting sleeve is connected fixedly in a non-positive and/or positively locking and/or integrally joined manner, to the tubular body by way of a fixing means, in particular in such a way that no movement of the connecting sleeve relative to the tubular body is possible.

8. The push-pull link bar as claimed in claim 4, wherein a fixing means is configured by way of an anti-rotation safeguard section and the friction section which bears at least partially against it, and/or in that a or the fixing means is configured by way of an adhesive bond.

9. The push-pull link bar as claimed in claim 4, wherein an anti-rotation safeguard section is configured or arranged on an outer circumference of a main body, a maximum external diameter in the region of the anti-rotation safeguard section being of greater configuration than a maximum external diameter in the region of the coupling section.

10. A push-pull link bar comprising:
    at least one connecting sleeve;
    a tubular body which, on an inner circumferential side, has at least one mating coupling section which corresponds to a coupling section of the connecting sleeve, the at least one connecting sleeve and the tubular body coming into contact with one another in an assembled position in a contact region which is formed by the coupling section and the mating coupling section, wherein the contact region is sealed toward an outside; and
    wherein the sealing of the contact region takes place by way of a first seal and a second seal,
    wherein the at least one connecting sleeve has the first seal which is arranged at least partially on an outer circumferential side of the push pull link bar and the second seal which closes at least a through bore in the push-pull link bar, and
    wherein the coupling section is configured at least partially as an external thread.

11. The push-pull link bar as claimed in claim 10, wherein a maximum external diameter of the second seal is of wider configuration than a minimum internal diameter of the mating coupling section of the tubular body, and/or is configured as an internal diameter of a core hole bore of the tubular body, which core hole bore is positioned behind the mating coupling section in an introduction direction of the connecting sleeve into the tubular body.

12. The push-pull link bar as claimed in claim 10, wherein the mating coupling section is configured at least partially as an internal thread.

13. The push-pull link bar as claimed in claim 10, wherein the first seal and/or the second seal are/is produced at least partially from at least one elastic material selected from the group consisting of rubber and/or a thermoplastic elastomer.

14. The push-pull link bar as claimed in claim 10, wherein the second seal is configured as a plug which has a part which is introduced into the through bore and a part which protrudes out of the through bore.

15. The push-pull link bar as claimed in claim 10, wherein the first seal has a radially outwardly tapering cross section in that the first seal has a trapezoidal cross section, the first seal being clamped or being capable of being clamped, in a prestressed state, at least partially in an undercut which is configured on a main body.

16. A push-pull link bar comprising:
  at least one connecting sleeve;
  a tubular body which, on an inner circumferential side, has at least one mating coupling section which corresponds to a coupling section of the connecting sleeve, the at least one connecting sleeve and the tubular body coming into contact with one another in an assembled position in a contact region which is formed by the coupling section and the mating coupling section, wherein the contact region is sealed toward an outside; and wherein the sealing of the contact region takes place by way of a first seal and a second seal,
  wherein the at least one connecting sleeve has the first seal which is arranged at least partially on an outer circumferential side of the push pull link bar and the second seal which closes at least a through bore in the push-pull link bar, and
  wherein the connecting sleeve has a securing ring for setting up an anti-rotation safeguard, which securing ring is arranged on an outer circumferential side around a main body, in particular in an anti-rotation safeguard section, the securing ring having tabs which, in an assembled position of the connecting sleeve, configure a latching connection at least with a latching structure on the main body.

17. The push-pull link bar as claimed in claim 16, wherein the first seal is configured as a sealing ring which is arranged so as to run continuously around an outer circumferential side of a main body.

18. The push-pull link bar as claimed in claim 16, wherein a first opening of the through bore is open, and a second opening of the through bore is closed by way of the second seal, an access to a coupling point which is configured or arranged on the inner circumferential side being configured by way of the first opening.

19. The push-pull link bar as claimed in claim 16, wherein the tubular body is produced from a metal selected from the group consisting of stainless steel, titanium and/or aluminum.

* * * * *